United States Patent
Lin

(10) Patent No.: US 12,461,656 B2
(45) Date of Patent: Nov. 4, 2025

(54) CONTROL METHOD OF MEMORY DEVICE, AND ASSOCIATED FLASH MEMORY CONTROLLER AND MEMORY DEVICE

(71) Applicant: Silicon Motion, Inc., Hsinchu County (TW)

(72) Inventor: Wen-Sheng Lin, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/814,579

(22) Filed: Aug. 25, 2024

(65) Prior Publication Data
US 2025/0094058 A1 Mar. 20, 2025

(30) Foreign Application Priority Data
Sep. 14, 2023 (TW) ................................ 112135084

(51) Int. Cl.
G06F 3/06 (2006.01)

(52) U.S. Cl.
CPC .......... *G06F 3/0616* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | |
|---|---|---|
| 8,516,187 B2 | 8/2013 | Chen |
| 2009/0089485 A1 | 4/2009 | Yeh |
| 2010/0205363 A1 | 8/2010 | Hwang |
| 2015/0277787 A1 | 10/2015 | Takubo |

FOREIGN PATENT DOCUMENTS

TW 202238369 A 10/2022

*Primary Examiner* — Kevin Verbrugge
(74) *Attorney, Agent, or Firm* — Winston Hsu

(57) ABSTRACT

A control method of a memory device includes: updating a wear leveling related data temporarily stored in a buffer memory; obtaining multiple parameters; determining a write frequency according to the multiple parameters; and copying the wear leveling related data from the buffer memory to a flash memory module included in the memory device according to the write frequency.

17 Claims, 7 Drawing Sheets

| Block number | Erase count |
|---|---|
| B1 | XXX |
| B2 | XXX |
| B3 | XXX |
| B4 | XXX |
| ⋮ | ⋮ |
| BN | XXX |

400

| Block number | Wear leveling count |
|---|---|
| B1 | XXX |
| B2 | XXX |
| B3 | XXX |
| B4 | XXX |
| ⋮ | ⋮ |
| BN | XXX |

FIG. 4

CONTROL METHOD OF MEMORY DEVICE, AND ASSOCIATED FLASH MEMORY CONTROLLER AND MEMORY DEVICE

BACKGROUND OF THE INVENTION

1. Field of the Invention

The present invention is related to a flash memory, and more particularly, to a control method of a memory device that can dynamically determine a frequency of writing an erase count mapping table into a flash memory module according to multiple parameters recorded by a flash memory controller.

2. Description of the Prior Art

Wear leveling technology is a widely used technique for flash memory devices. Wear leveling technology can write data evenly into each block of a flash memory module included in the flash memory device, in order to avoid permanent damage caused by excessive erasing of a single block, and thereby avoid reduced data quality or data loss problems. As a result, the wear leveling technology can improve durability and stability of the flash memory module.

In wear leveling technology, a flash memory controller determines a source block and a target block in the flash memory module according to related data, and moves all data in the source block to the target block, wherein the source block is a block with a lower erase count, and the target block is a block with a higher erase count. In order to determine the source block and the target block, the flash memory controller may create an erase count mapping table that records an erase count (or an accumulated erase count) of each block in the flash memory module, in order to perform the wear leveling. Since the erase count mapping table may be continuously updated due to block erasure, the erase count mapping table may be temporarily stored in a buffer memory of the flash memory controller, and may be written into the flash memory module at an appropriate time point. The buffer memory, however, is a volatile memory, so the erase count mapping table may be lost if the flash memory controller suffers from a sudden power off, and the repowered-on flash memory controller will therefore need to read the old erase count mapping table from the flash memory module. Under this situation, the erase count mapping table is unable to reflect an actual erase count of each block in the flash memory module. In addition, if the flash memory controller often suffers from the sudden power off, the distortion of the erase count mapping table may be more serious.

In order to solve the problem that the erase count mapping table cannot reflect the actual erase count of each block caused by the sudden power off, the erase count mapping table temporarily stored in the buffer memory may be written into the flash memory module periodically and frequently. Frequently writing the erase count mapping table into the flash memory module, however, will affect the overall performance of the memory device. As a result, how to determine a frequency of writing the erase count mapping table into the flash memory module is an important issue.

SUMMARY OF THE INVENTION

It is therefore one of the objectives of the present invention to provide a control method of a memory device that can dynamically determine a frequency of writing an erase count mapping table into a flash memory module according to multiple parameters recorded by a flash memory controller, to address the above-mentioned issues.

According to an embodiment of the present invention, a control method of a memory device is provided, wherein the memory device comprises a flash memory module, and the flash memory module comprises multiple blocks. The control method comprises: updating a wear leveling related data temporarily stored in a buffer memory; obtaining multiple parameters; determining a write frequency according to the multiple parameters; and copying the wear leveling related data from the buffer memory to the flash memory module according to the write frequency.

According to an embodiment of the present invention, a flash memory controller is provided, wherein the flash memory controller is arranged to access a flash memory module, the flash memory module comprises multiple blocks, and the flash memory controller comprises a read only memory, a buffer memory, and a microprocessor. The read only memory is arranged to store a program code. The microprocessor is arranged to execute the program code to control access of the flash memory module, and is further arranged to: update a wear leveling related data temporarily stored in the buffer memory; obtain multiple parameters; determine a write frequency according to the multiple parameters; and copy the wear leveling related data from the buffer memory to the flash memory module according to the write frequency.

According to an embodiment of the present invention, a memory device is provided, wherein the memory device comprises a flash memory module and a flash memory controller. The flash memory module comprises multiple blocks. The flash memory controller is arranged to access the flash memory module, and is further arranged to: update a wear leveling related data temporarily stored in a buffer memory of the flash memory controller; obtain multiple parameters; determine a write frequency according to the multiple parameters; and copy the wear leveling related data from the buffer memory to the flash memory module according to the write frequency.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating a wear leveling count mapping table.

DETAILED DESCRIPTION

Figure 1:
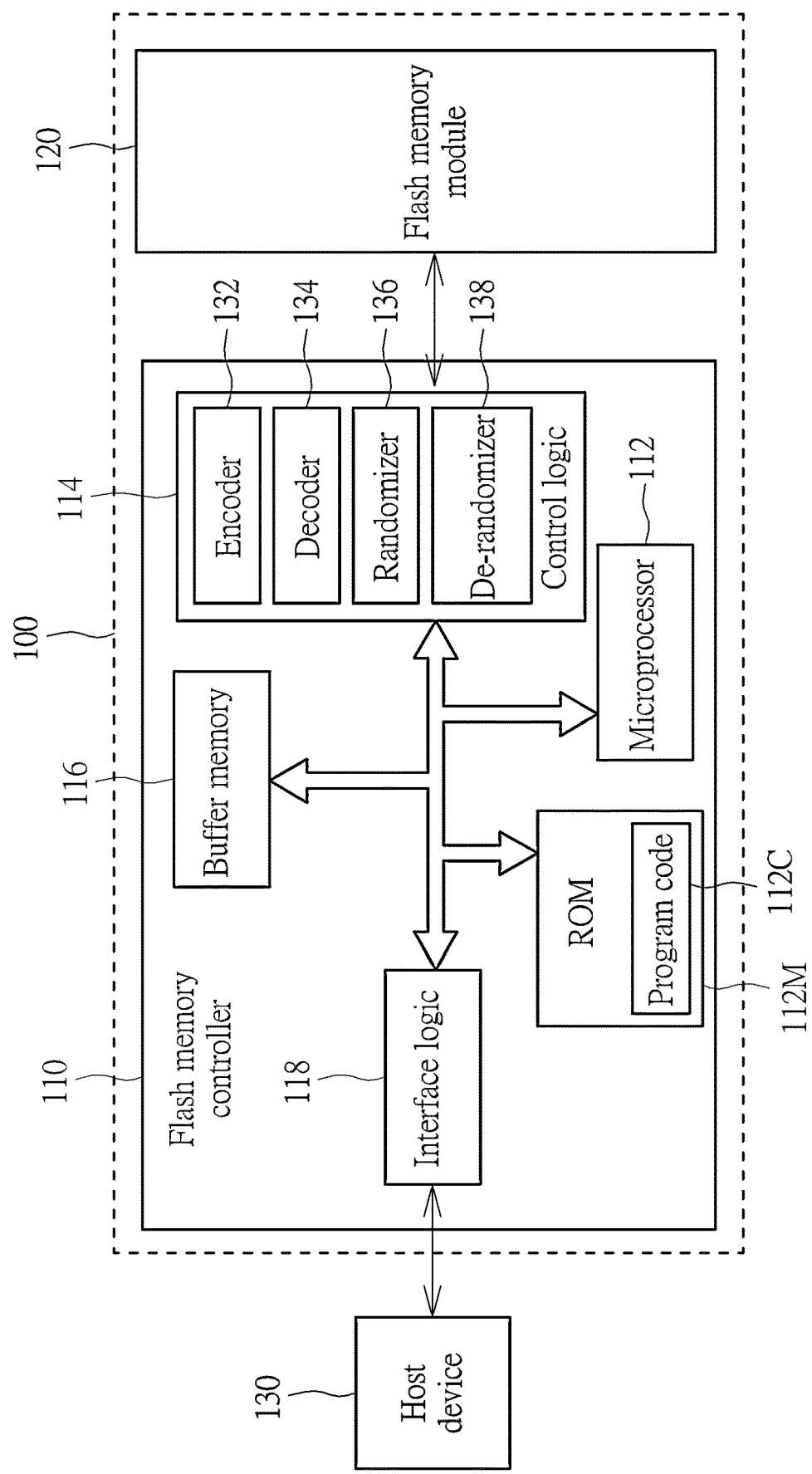
FIG. 1 is a diagram illustrating a memory device according to an embodiment of the present invention.

FIG. 1 is a diagram illustrating a memory device 100 according to an embodiment of the present invention. The memory device 100 includes a flash memory controller 110 and a flash memory module 120, wherein the flash memory controller 110 is arranged to access the flash memory module 120. In this embodiment, the flash memory controller 110 includes a microprocessor 112, a read only memory (ROM) 112M, a control logic 114, a buffer memory 116, and an interface logic 118. The ROM 112M is arranged to store a program code 112C. The microprocessor 112 is arranged to execute the program code 112C to control access of the flash memory module 120. The control logic 114 includes an encoder 132, a decoder 134, a randomizer 136, and a de-randomizer 138. The encoder 132 is arranged to encode data written into the flash memory module 120 to generate a corresponding check code (or an error correction code (ECC)). The decoder 134 is arranged to decode data read from the flash memory module 120. The randomizer 136 is arranged to perform a randomization operation upon data written into the flash memory module 120. The de-randomizer 138 is arranged to perform a de-randomization operation upon data read from the flash memory module 120.

The flash memory module 120 includes multiple flash memory chips, wherein each of the multiple flash memory chips includes a plurality of blocks, and the flash memory controller 110 may perform a copy operation, an erase operation, or a data merging operation upon the flash memory module 120 in units of blocks. In addition, a block may record a specific number of data pages, wherein the flash memory controller 110 may perform a data writing operation upon the flash memory module 120 in units of data pages. In other words, the minimum erase unit for the flash memory module 120 is a block, and the minimum writing unit for the flash memory module 120 is a data page.

In practice, the flash memory controller 110 that executes the program code 112C through the microprocessor 112 may utilize its own internal components to perform many control operations. For example, the flash memory controller 110 may utilize the control interface 114 to control access of the flash memory module 120 (more particularly, access of at least one block or at least one page), utilize the buffer memory 116 to perform a required buffering operation, and utilize the interface logic 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 may be a solid state drive (SSD) or an embedded storage device conforming to the universal flash storage (UFS) or embedded multi-media card (EMMC) specifications, and may be arranged in an electronic device. For example, the memory device 100 may be arranged in a cellphone, a watch, a portable medical testing device (e.g., a medical bracelet), a laptop, or a desktop computer. In this case, the host device 130 may be a processor of the electronic device.

In this embodiment, the flash memory module 120 is a 3D NAND-type flash memory module, wherein each block is composed of multiple word lines, multiple bit lines, and multiple memory cells. Since architecture of the 3D NAND-type flash memory module is well known to those skilled in the art, further descriptions are omitted here.

Figure 2:
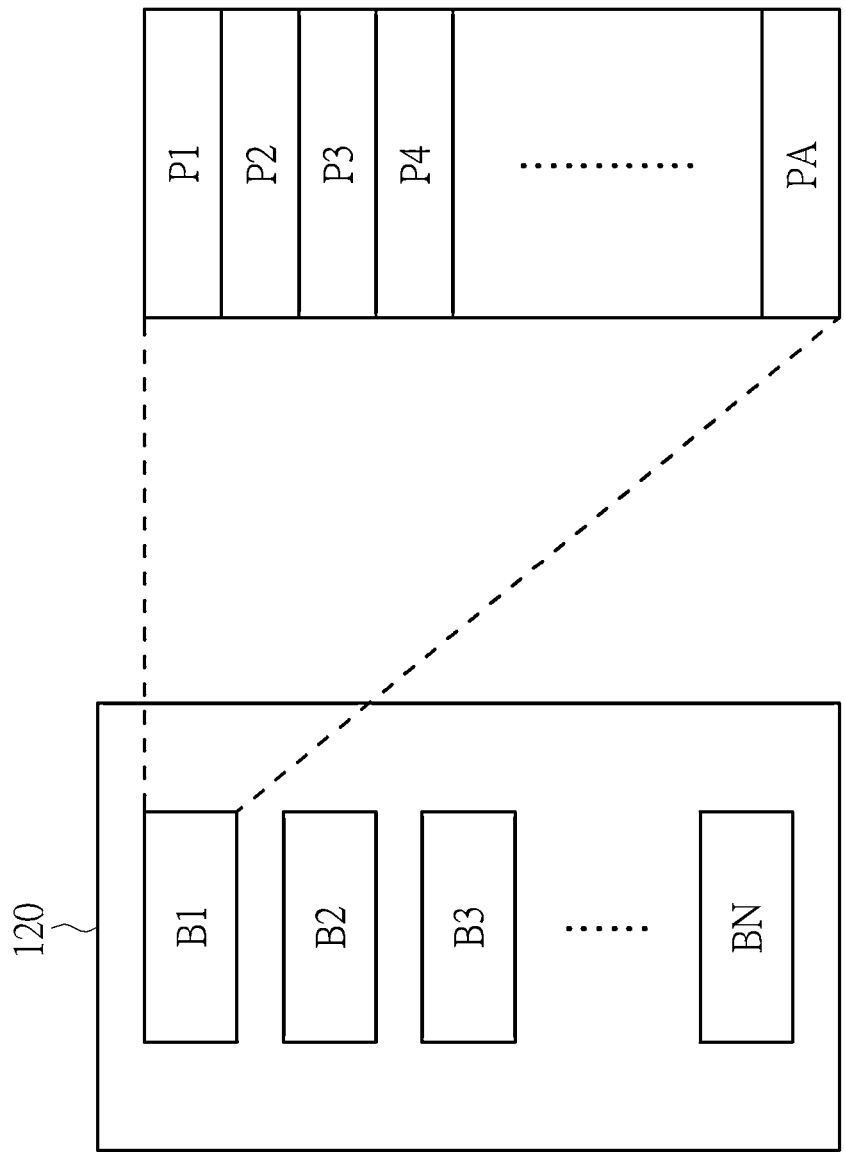
FIG. 2 is a diagram illustrating a flash memory module.

FIG. 2 is a diagram illustrating a flash memory module 120. As shown in FIG. 2, the flash memory module 120 includes multiple blocks B1-BN, wherein the blocks B1-BN may include at least one type of block (e.g., the blocks B1-BN may include a single-level cell (SLC) block, a multi-level cell (MLC)) block, a triple-level cell (TLC) block, and/or a quad-level cell (QLC) block). In addition, each block includes multiple data pages (e.g., multiple data pages P1-PA shown in FIG. 2).

Figure 3:
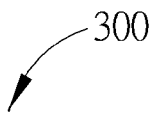
FIG. 3 is a diagram illustrating an erase count mapping table.

In order to manage the flash memory module 120, the flash memory controller 110 may create and continue to update an erase count mapping table 300 shown in FIG. 3, wherein the erase count mapping table 300 is temporarily stored in the buffer memory 116 of the flash memory controller 110. As shown in FIG. 3, the erase count mapping table 300 records an erase count of each of the blocks B1-BN, wherein "Erase count" represents an accumulated erase count of a block since the memory device 100 was used. Specifically, the flash memory controller 110 may need to select one or more blocks for performing erase operations due to some mechanisms, in order to delete all data of a block to make the block become a blank block for subsequent use. For example, if the number of remaining blank blocks within the flash memory module 120 is less than a threshold value, the flash memory controller 110 may perform a garbage collection (GC) operation to select multiple blocks with fewer valid data pages, move all valid data of these blocks to one or more blank blocks, and perform an erase operation upon these blocks to make these blocks become blank blocks. At this moment, "1" is added to erase counts of these blocks in the erase count mapping table 300. In another example, the flash memory controller 110 may record a read count of each block, wherein the read count of each block may be reset after an erase operation is performed upon the block. Since the data quality of a block with a larger read count is poor, the flash memory controller 110 may select a block with a read count higher than a threshold value, remove all data of the block to a blank block, and perform an erase operation upon the block to make the block become a blank block. At this moment, "1" is added to the erase count of the block in the erase count mapping table 300. In another example, if the flash memory controller 110 detects that the number of error bits of a block is higher than a threshold value when reading the block, the flash memory controller 110 may move all data of the block to a blank block at an appropriate time point, and perform an erase operation upon the block to make the block become a blank block. At this moment, "1" is added to the erase count of the block in the erase count mapping table 300.

In addition, the flash memory controller 110 may create and continue to update a wear leveling count mapping table 400 shown in FIG. 4, wherein the wear leveling count mapping table 400 is temporarily stored in the buffer memory 116 of the flash memory controller 110. As shown in FIG. 4, the wear leveling count mapping table 400 records a wear leveling count of each of the blocks B1-BN, wherein "Wear leveling count" represents an accumulated erase count of a block generated due to a wear leveling mechanism since the memory device 100 was used. Specifically, the updating of the wear leveling count mapping table 400 may refer to a flow chart shown in FIG. 5.

In Step 500, the flow starts, and the memory device 100 is powered on and starts to operate.

In Step 502, the flash memory controller 110 determines whether the maximum erase count difference value between blocks is greater than a threshold value according to contents of the erase count mapping table 300. If Yes, Step 504 is entered; if No, the flow stays at Step 502. For example, the maximum erase count difference value may be a difference value between the maximum erase count and the minimum erase count recorded in the erase count mapping table 300.

In Step 504, the flash memory controller 110 selects a source block and a target block, wherein the source block may be a block with the minimum erase count or a block with a lower erase count in the erase count mapping table 300, and the target block may be a block with the maximum erase count in the erase count mapping table 300.

In Step 506, the flash memory controller 110 performs an erase operation upon the target block to make the target block become a blank block. At this moment, the flash memory controller 110 updates the erase count mapping table 300 and the wear leveling count mapping table 400, in order to add "1" to the erase count and the wear leveling count of the target block. It should be noted that, if the target block is already a blank block, Step 506 can be ignored.

In Step 508, the flash memory controller 110 moves all contents of the source block to the target block.

In Step 510, the flash memory controller 110 performs an erase operation upon the source block to make the source block become a blank block. At this moment, the flash memory controller 110 updates the erase count mapping table 300 to add "1" to the erase count of the source block. It should be noted that the flash memory controller 110 does not update the wear leveling count mapping table 400 due to erasing of the source block.

Figure 5:
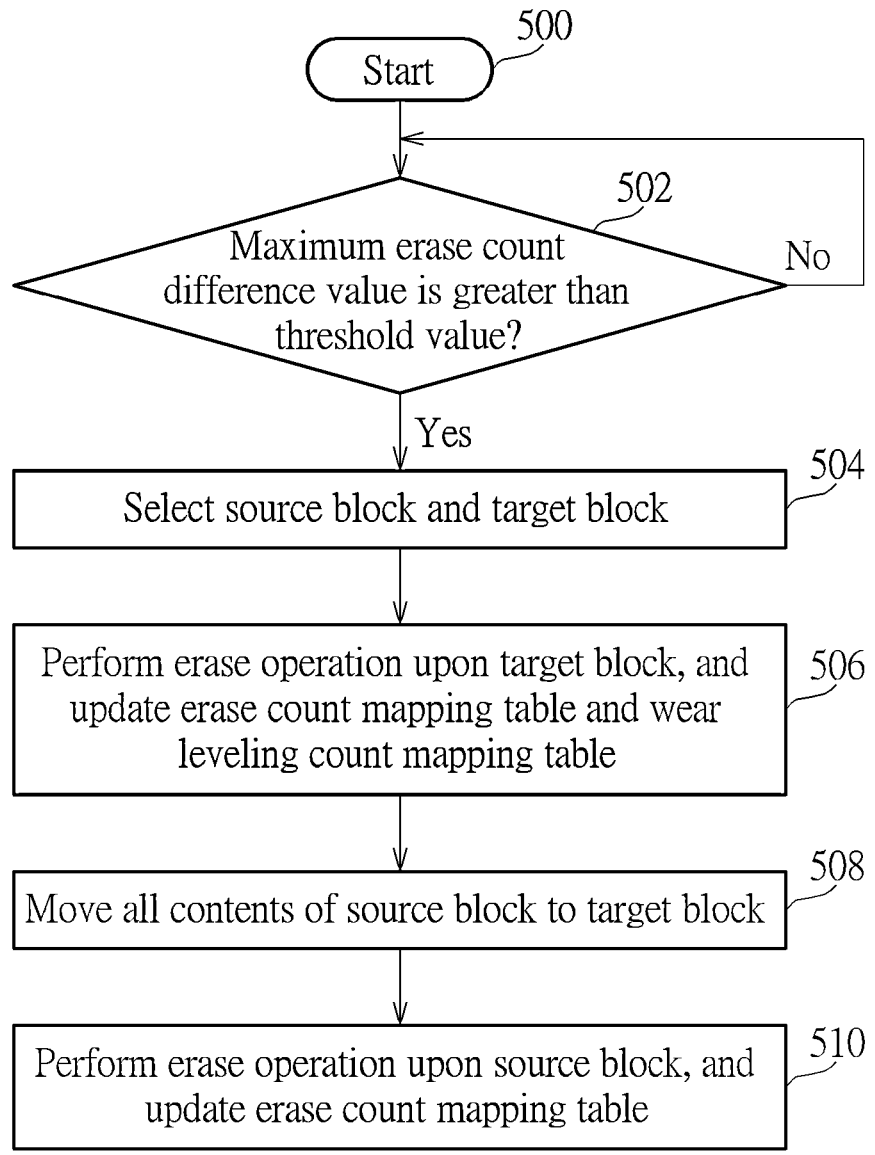
FIG. 5 is a flow chart of updating the wear leveling count mapping table according to an embodiment of the present invention.

In the flow shown in FIG. 5, since a block with the minimum erase count or a lower erase count represents that stored data is cold data (e.g., data that is rarely updated), the target block can store the cold data by moving data of the source block with the minimum erase count or a lower erase count to the target block with the maximum erase count, in order to reduce the probability that a GC operation is required to be performed upon the target block for being erased.

Figure 6:
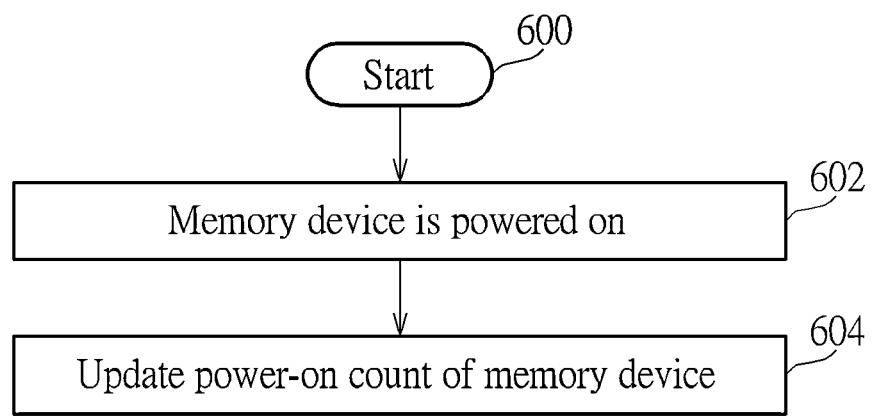
FIG. 6 is a flow chart of updating a power-on count of a memory device.

In addition, the flash memory controller 110 may create and continue to update a power-on count of the memory device 100. This is illustrated in the flow chart shown in FIG. 6.

In Step 600, the flow starts, and the memory device 100 is not powered on at this moment.

In Step 602, the memory device 100 is powered on, and the flash memory controller 110 and the flash memory module 120 complete initialization operations.

In Step 604, the flash memory controller 110 reads a power-on count stored in the flash memory module 120, updates the power-on count (i.e., adds "1" to the power-on count), and stores updated power-on count into the flash memory module 120.

Figure 7:
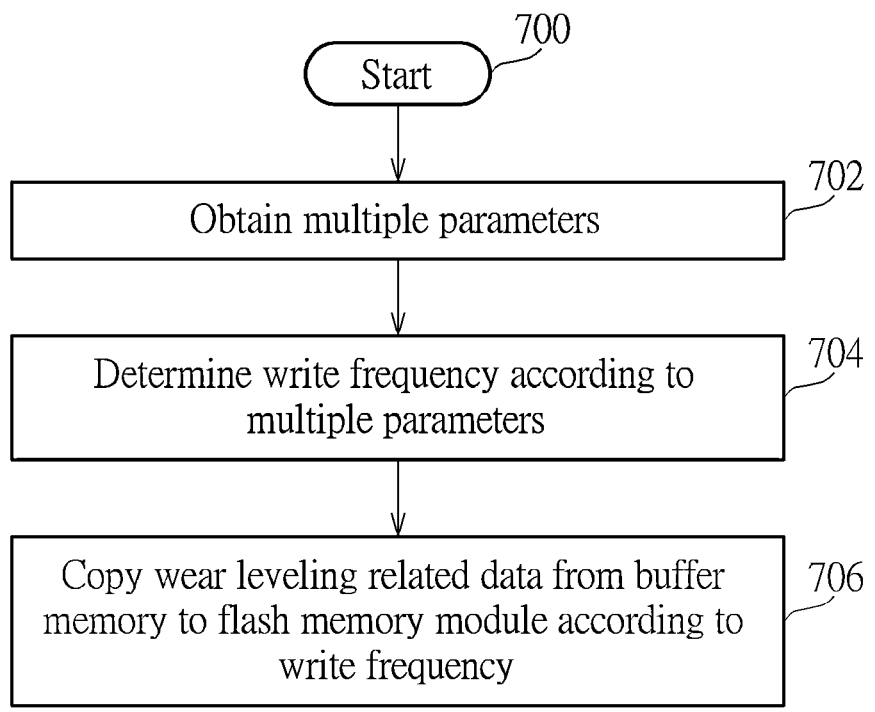
FIG. 7 is a flow chart of a control method of a memory device according to an embodiment of the present invention.

FIG. 7 is a flow chart of a control method of the memory device 100 according to an embodiment of the present invention.

In Step 700, the flow starts.

In Step 702, the flash memory controller 110 obtains multiple parameters, wherein the multiple parameters include at least one portion of an erase count sum, a wear leveling count sum, the maximum erase count difference value between blocks, a wear leveling threshold value, a power-on count of the memory device 100, and a write data sum. For example, the erase count sum is a sum of erase counts of all blocks in the flash memory module 120 (i.e., a sum of all erase counts in the erase count mapping table 300). The wear leveling count sum may be an accumulated erase count of all blocks in the flash memory module 120 generated due to a wear leveling mechanism (i.e., a sum of all wear leveling counts in the wear leveling count mapping table 400). The maximum erase count difference value is a difference value of the maximum erase count and the minimum erase count recorded in the erase count mapping table 300. The wear leveling threshold value may be a threshold value determined according to the type of the blocks. For example, if the blocks B1-BN are SLC blocks, the wear leveling threshold value may be a higher value (e.g., 10% of an allowable erase count of an SLC block (e.g., 100000 times)). If the blocks B1-BN are TLC blocks, the wear leveling threshold value may be a lower value (e.g., 10% of an allowable erase count of a TLC block (e.g., 3000 times)). The write data sum is a sum of an amount of write data since the flash memory module 120 began to be used (i.e., all data that has ever been written), wherein the write data sum may be estimated according to the erase count mapping table 300, a size of each block, and a current amount of data stored in the flash memory module 120.

In Step 704, the flash memory controller 110 may determine a write frequency of copying wear leveling related data from the buffer memory 116 to the flash memory module 120 according to the multiple parameters. In a first embodiment, the flash memory controller 110 may determine the write frequency according to a ratio of the wear leveling count sum to the erase count sum. When the ratio is higher, it means that more wear leveling operations have been performed in the past, and that the source block and/or the target block selected when the wear leveling operations were performed in the past may not be quite appropriate; thereby the write frequency is required to be increased. For example, when the ratio is located in a first range interval with higher values, the flash memory controller 110 may determine a higher first write frequency. When the ratio is located in a second range interval with lower values, the flash memory controller 110 may determine a lower second write frequency.

In a second embodiment, the flash memory controller 110 may determine the write frequency according to a ratio of the maximum erase count difference value to the wear leveling threshold value. When the ratio is higher, it means that the erase count difference between blocks has a greater impact on the flash memory module 120, and thereby the write frequency is required to be increased. For example, when the ratio is located in a first range interval with higher values, the flash memory controller 110 may determine a higher first write frequency. When the ratio is located in a second range interval with lower values, the flash memory controller 110 may determine a lower second write frequency.

In a third embodiment, the flash memory controller 110 may determine the write frequency according to a ratio of the power-on count of the memory device 100 to the write data sum. When the ratio is higher, it means that the probability of errors in the wear leveling related data (e.g., the erase count mapping table 300, the wear leveling count mapping table 400, a current wear leveling state, and a GC state) caused due to the sudden power off is higher, and thereby the write frequency is required to be increased. For example, when the ratio is located in a first range interval with higher values, the flash memory controller 110 may determine a higher first write frequency. When the ratio is located in a second range interval with lower values, the flash memory controller 110 may determine a lower second write frequency.

In a fourth embodiment, the flash memory controller 110 may determine the write frequency according to at least two of the three ratios mentioned in the first embodiment, the second embodiment, and the third embodiment. Assume that the ratio of the wear leveling count sum to the erase count sum is represented by "A", the ratio of the maximum erase count difference value to the wear leveling threshold value is represented by "B", and the ratio of the power-on count to the write data sum is represented by "C". The flash memory controller 110 may calculate a specific parameter D by one of the following equations (1)-(4):

$$D = W1*A + W2*B; \quad (1)$$
$$D = W1*A + W3*C; \quad (2)$$
$$D = W2*B + W3*C; \quad (3)$$
$$D = W1*A + W2*B + W3*C; \quad (4)$$

wherein W1, W2, and W3 correspond to weights of A, B, and C, respectively. In this embodiment, the write frequency is required to be increased when the value of the specific parameter D is higher. For example, when the specific parameter D is located in a first range interval with higher values, the flash memory controller 110 may determine a higher first write frequency. When the specific parameter D is located in a second range interval with lower values, the flash memory controller 110 may determine a lower second write frequency.

It should be noted that the number of range intervals mentioned in the above embodiments is for illustrative purposes only. In other embodiments, the flash memory controller 110 may determine to which of multiple range intervals the specific parameter D belongs in order to determine a corresponding write frequency. As long as a higher value of the specific parameter D corresponds to a higher write frequency, the number of the multiple range intervals can be determined by a designer.

In Step 706, the flash memory controller 110 determines a subsequent frequency of copying the wear leveling related data from the buffer memory 116 to the flash memory module 120 according to the write frequency determined in Step 704. Specifically, if the flash memory controller 110 determines the higher first write frequency in Step 704, the flash memory controller 110 will frequently copy the wear leveling related data from the buffer memory 116 to the flash memory module 120 in order to avoid distortion of the wear leveling related data due to the sudden power off. If the flash memory controller 110 determines the lower second write frequency in Step 704, the flash memory controller 110 will extend a period in which the wear leveling related data is written into the flash memory module 120 (i.e., longer time will be taken before the wear leveling related data is written into the flash memory module 120 again), in order to avoid affecting the efficiency of the memory device 100.

In summary, by dynamically adjusting a frequency of writing wear leveling related data into a flash memory module according to multiple parameters, the problem of distortion of the wear leveling related data caused by a sudden power off can be effectively reduced, and excessive impact on the overall performance of a memory device can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a memory device, wherein the memory device comprises a flash memory module, the flash memory module comprises multiple blocks, and the control method comprises:
    updating a wear leveling related data temporarily stored in a buffer memory;
    obtaining multiple parameters;
    determining a write frequency according to the multiple parameters; and
    copying the wear leveling related data from the buffer memory to the flash memory module according to the write frequency.

2. The control method of claim 1, wherein the wear leveling related data at least comprises an erase count mapping table, and the erase count mapping table records an erase count of each block among the multiple blocks.

3. The control method of claim 1, wherein the multiple parameters comprise an erase count sum and a wear leveling count sum, the erase count sum is a sum of erase counts of the multiple blocks, and the wear leveling count sum is an accumulated erase count generated by the multiple blocks due to a wear leveling mechanism.

4. The control method of claim 3, wherein the step of determining the write frequency according to the multiple parameters comprises:
    determining the write frequency according to a ratio of the erase count sum to the wear leveling count sum.

5. The control method of claim 4, wherein the step of determining the write frequency according to the multiple parameters comprises:
    in response to the ratio being located in a first range interval, determining a first write frequency as the write frequency; and
    in response to the ratio being located in a second range interval, determining a second write frequency as the write frequency;
    wherein a value of the first range interval is greater than a value of the second range interval, and the first write frequency is higher than the second write frequency.

6. The control method of claim 1, wherein the multiple parameters comprise a wear leveling threshold value and a maximum erase count difference value between the multiple blocks.

7. The control method of claim 6, wherein the step of determining the write frequency according to the multiple parameters comprises:
    determining the write frequency according to a ratio of the maximum erase count difference value to the wear leveling threshold value.

8. The control method of claim 7, wherein the step of determining the write frequency according to the multiple parameters comprises:
    in response to the ratio being located in a first range interval, determining a first write frequency as the write frequency; and
    in response to the ratio being located in a second range interval, determining a second write frequency as the write frequency;
    wherein a value of the first range interval is greater than a value of the second range interval, and the first write frequency is higher than the second write frequency.

9. The control method of claim 1, wherein the multiple parameters comprise a power-on count of the memory device and a write data sum of the flash memory module.

10. The control method of claim 9, wherein the step of determining the write frequency according to the multiple parameters comprises:
   determining the write frequency according to a ratio of the power-on count to the write data sum.

11. The control method of claim 10, wherein the step of determining the write frequency according to the multiple parameters comprises:
   in response to the ratio being located in a first range interval, determining a first write frequency as the write frequency; and
   in response to the ratio being located in a second range interval, determining a second write frequency as the write frequency;
   wherein a value of the first range interval is greater than a value of the second range interval, and the first write frequency is higher than the second write frequency.

12. The control method of claim 1, wherein the multiple parameters comprise an erase count sum, a wear leveling count sum, a maximum erase count difference value between the multiple blocks, and a wear leveling threshold value; and the step of determining the write frequency according to the multiple parameters comprises:
   determining the write frequency according to a ratio of the erase count sum to the wear leveling count sum and a ratio of the maximum erase count difference value to the wear leveling threshold value.

13. The control method of claim 1, wherein the multiple parameters comprise an erase count sum, a wear leveling count sum, a power-on count of the memory device, and a write data sum of the flash memory module; and the step of determining the write frequency according to the multiple parameters comprises:
   determining the write frequency according to a ratio of the erase count sum to the wear leveling count sum and a ratio of the power-on count to the write data sum.

14. The control method of claim 1, wherein the multiple parameters comprise a maximum erase count difference value between the multiple blocks, a wear leveling threshold value, a power-on count of the memory device, and a write data sum of the flash memory module; and the step of determining the write frequency according to the multiple parameters comprises:
   determining the write frequency according to a ratio of the maximum erase count difference value to the wear leveling threshold value and a ratio of the power-on count to the write data sum.

15. The control method of claim 1, wherein the multiple parameters comprise an erase count sum, a wear leveling count sum, a maximum erase count difference value between the multiple blocks, a wear leveling threshold value, a power-on count of the memory device, and a write data sum of the flash memory module; and the step of determining the write frequency according to the multiple parameters comprises:
   determining the write frequency according to a ratio of the erase count sum to the wear leveling count sum, a ratio of the maximum erase count difference value to the wear leveling threshold value, and a ratio of the power-on count to the write data sum.

16. A flash memory controller, wherein the flash memory controller is arranged to access a flash memory module, the flash memory module comprises multiple blocks, and the flash memory controller comprises:
   a read only memory, arranged to store a program code;
   a buffer memory; and
   a microprocessor, arranged to execute the program code to control access of the flash memory module;
   wherein the microprocessor is further arranged to:
      update a wear leveling related data temporarily stored in the buffer memory;
      obtain multiple parameters;
      determine a write frequency according to the multiple parameters; and
      copy the wear leveling related data from the buffer memory to the flash memory module according to the write frequency.

17. A memory device, comprising:
   a flash memory module, comprising multiple blocks; and
   a flash memory controller, arranged to access the flash memory module;
   wherein the flash memory controller is further arranged to:
      update a wear leveling related data temporarily stored in a buffer memory of the flash memory controller;
      obtain multiple parameters;
      determine a write frequency according to the multiple parameters; and
      copy the wear leveling related data from the buffer memory to the flash memory module according to the write frequency.

* * * * *